No. 841,189. PATENTED JAN. 15, 1907.
R. SCHNICKE.
ELASTIC WHEEL FOR VEHICLES.
APPLICATION FILED JULY 20, 1906.

Witnesses:
C. Heymann.
L. Waldman

Inventor:
Richard Schnicke
by B. Singer atty.

UNITED STATES PATENT OFFICE.

RICHARD SCHNICKE, OF CHEMNITZ, GERMANY.

ELASTIC WHEEL FOR VEHICLES.

No. 841,189.  Specification of Letters Patent.  Patented Jan. 15, 1907.

Application filed July 20, 1906. Serial No. 327,069.

*To all whom it may concern:*

Be it known that I, RICHARD SCHNICKE, a subject of the German Emperor, residing at Chemnitz, in the Kingdom of Saxony and Empire of Germany, have invented certain new and useful Improvements in Elastic Wheels for Automobiles and other Vehicles, of which the following is a specification.

This invention relates to elastic wheels especially adapted for automobiles and also for other vehicles.

As is well known, pneumatic tires used on automobile-wheels cause considerable trouble and even accidents. When traveling at a high speed, for instance, should a pneumatic tire burst or be suddenly deflated the periphery of this wheel becomes smaller, so that the vehicle deviates suddenly from its course and before the driver has had time to operate the steering device of the car it describes a sharp curve, being possibly thrown into a ditch or against an obstacle. It has therefore been tried to substitute for pneumatic tires solid tires, the elastic support consisting of an arrangement of springs; but such elastic tires have the disadvantage that the resilience of the springs can only act in tangential and radial directions in the plane of the wheel, such wheels having consequently a hard course.

These disadvantages are obviated in the present invention, the rim of the wheel being carried by bolts which are each supported by two spiral springs arranged facing each other in such a manner that the bolts can have movement not only in the plane of the wheel, but at any angle to the same.

A form of construction of the invention is shown in the accompanying drawings, in which—

Figure 1:
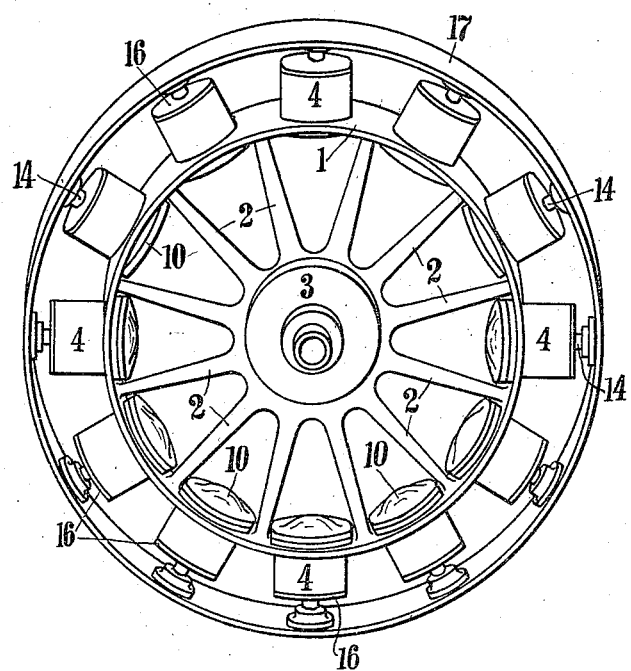
Figure 2:
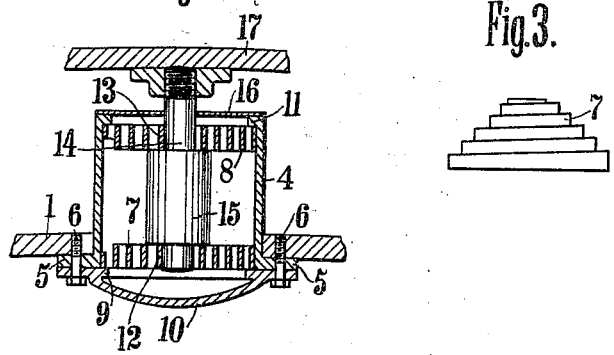
Figure 3:

Figure 1 is a perspective view. Fig. 2 is a section in a plane vertical to the axis of a detail of the wheel on an enlarged scale. Fig. 3 is a side elevation showing the form of the spiral springs before they have been placed in position for supporting the bolt.

The improved wheel consists of a tire 1, constructed of iron, steel, wood, or other suitable material, rigidly connected to the nave 3 of the wheel by means of spokes 2. Pockets or chambers 4 are attached to the tire 1 by means of flanges 5, by which they are fixed to the inner surface of the tire 1 by means of bolts or screws 6. Inside the pockets 4 are arranged two springs 7 and 8, the former supported by a flange 9 of the cover 10 of the pocket, and the latter by the flange 11 of the pocket 4. The spiral coils of the springs 7 and 8 do not lie flat or in one plane before they are placed in position for supporting the bolts, but project in helical form, as shown in somewhat an exaggerated manner in Fig. 3. At the inner ends 12 and 13 of the springs 7 and 8 the bolts 14, which are attached to the rim 17 of the wheel, are so supported that the springs are compressed by a collar 15, rigidly connected to the bolt 14, whereby the spirals lie practically in a plane.

The apertures of the pockets 4 opposite to the cover 10 are closed by disks or plates 16 of rubber or any elastic material, the bolts 14 passing through said disks. On account of the elastic and yielding material of the disks 16 the movement of the bolts 14 at any angle to the plane of the wheel is not hindered.

The outer surface of the rim 17 may be covered with india-rubber for the sake of appearance, as also to allow of quiet motion of the vehicle.

Having now fully described my invention, I declare that what I claim is—

1. In an elastic wheel the combination of a rim, a tire concentric thereto, bolts to which said rim is attached, two spiral springs facing each other surrounding said bolts adapted to move in a direction in the plane of the wheel and at an angle to the same, substantially as and for the purpose set forth.

2. In an elastic wheel the combination of a rim, a tire concentric thereto, bolts to which said rim is fixed and means of enabling said bolts to move both in a direction in the plane of the wheel and at an angle thereto, substantially as and for the purpose set forth.

3. In an elastic wheel the combination of a rim, a tire concentric thereto, bolts to which said rim is fixed, springs supporting said bolts adapted to move both in a direction in the plane of the wheel and at an angle to the same, substantially as and for the purpose set forth.

4. In an elastic wheel the combination of a rim, a tire concentric thereto, pockets fixed to said tire, bolts attached to said rim extending into said pockets, a set of two spiral springs surrounding said bolts in each of said pockets facing each other.

5. In an elastic wheel the combination of a rim, a tire concentric thereto, pockets fixed to said tire, bolts attached to said rim respectively extending into said pockets provided at their upper and lower end with a